SERGE H. PICHAFROY,
INVENTOR.
BY Stephen H. Frishauf, Atty

Aug. 29, 1967 S. H. PICHAFROY 3,339,199

SINGLE-CHANNEL SIGNAL-PROCESSING NETWORK AND MONOPULSE RECEIVER SYSTEMS EMBODYING THE SAME

Filed Dec. 22, 1965 3 Sheets-Sheet 3

United States Patent Office 3,339,199
Patented Aug. 29, 1967

3,339,199

SINGLE-CHANNEL SIGNAL-PROCESSING NETWORK AND MONOPULSE RECEIVER SYSTEMS EMBODYING THE SAME

Serge H. Pichafroy, Paris, France, assignor to Compagnie Francaise Thomson Houston-Hotchkiss Brandt, Paris, France, a corporation of France Filed Dec. 22, 1965, Ser. No. 515,686
Claims priority, application France, Dec. 24, 1964, 999,881, Patent 1,432,581
12 Claims. (Cl. 343—16)

ABSTRACT OF THE DISCLOSURE

In the monopulse receiver of FIG. 2, the azimuth and elevation difference signals D*g* and D*s* are modulated in modulators 40 and 42 in quadrature relation with a signal from local oscillator 52. The modulation products are additively combined with each other and with the received sum signal S. The resulting composite signal is amplitude-limited in limiting amplifier 34, and passed through frequency discriminator 36. The discriminator output represents the phase modulation component of the composite signal and is demodulated in demodulators 64 and 66 in quadrature relation with the local oscillator signal to provide the separate azimuth and elevation angle signals $\Delta g$ and $\Delta s$.

This invention relates to electrical apparatus for processing, in a single channel, a plurality of input signals each of which is a simultaneous function of more than one variable in order to derive output signals therefrom that are separate functions of the respective variables.

The invention was developed in connection with monopulse radar receiver systems and will consequently be disclosed with primary reference to that particular application. It is to be understood however that the concepts of the invention are applicable to other types of system in the field of communications and information transfer.

In a monopulse radar receiver, the input information serving to derive the amounts of angular displacement of a target from the reference direction in azimuth and in elevation appears in the form of signal ratios. These signal ratios in turn are obtained by comparing pairs of received signals picked up by respective pairs of antenna elements that are displaced in the horizontal and vertical planes, or an equivalent antenna array.

In one widely used form of monopulse, the so-called "sum-and-difference" system, the four crude signals picked up by two pairs of horizontally and vertically displaced antennas (or equivalent array) are combined additively and subtractively in such a manner as to produce three useful signals, the so-called azimuth difference, elevation difference and sum signals. Each of these three signals is a composite function of the azimuth and elevation displacement angles. The three signals are then processed in a suitable network which, essentially, serves to derive the ratios of the respective difference signals to the sum signal. Ideally, these two ratios are pure functions of azimuth and elevation displacements respectively, and thus provide the desired information as to the angular position of the target relative to the reference, or "boresight," axis. The sum signal serves to derive range information.

Many different types of network have been proposed for thus processing the azimuth and elevation difference and the sum signals in a monopulse receiver. Most of these networks involve the use of three channels, or sometimes two channels, through which the signals are passed and separately amplified. This imposes stringent requirements on the dynamic gain and phase characteristics of the channel amplifiers, as will be described in greater detail later, and the impairment of these characteristics with time brings with it a serious limitation on the accuracy and sensitivity of the system. Also, such multichannel networks generally require the use of automatic gain control for normalizing the signal amplitudes in all the channels; this may increase the response time of the system to an extent incompatible with multi-target tracking as for example a beam guidance system.

Single-channel monopulse signal processing networks have also heretofore been proposed, which have been based on a time-sharing technique or on the use of different frequencies for the different monopulse signals. Time-sharing networks, in which the signals are delayed by selective amounts, are limited to the detection of pulsed point sources separated by a minimum radial distance. Moreover, they are not consistent with ready demodulation of the difference signals by coherent demodulation techniques, and for these reasons such networks are entirely unsatisfactory for many important applications of the present day. In the second type of single-channel network wherein the signals are diversified in frequency rather than time, there necessarily results a considerable broadening in the bandwidth of the signal channel. Such an increase is prohibitive in many instances, for example where the received signals serve to convey pulse-modulated information in addition to their bare position-indicating function, as is the case with secondary radar and I-F-F systems, and in communications with telemetering satellites.

An object of this invention is to provide an improved single-channel monopulse receiver system of improved performance characteristics.

Other objects are to provide an improved network for the processing of a plurality of input signals of the kind specified, which will possess the following advantages:

It will be essentially single-channel in character thereby eliminating the inherent defects of two- and more-channel networks including stringent gain and phase tolerances between the respective channels, incorporation of sluggish AGC loops, and other deficiencies;

It will at the same time be completely free from the deficiencies of conventional single-channel networks operating on a time-sharing or a frequency-spread basis;

It will achieve a substantially full separation of the variables contained in the input signals and eliminate cross coupling of the variables between the output signals.

The disclosure will now proceed with reference to a preferred embodiment of the invention illustrated in the accompanying drawing wherein.

Figure 1:
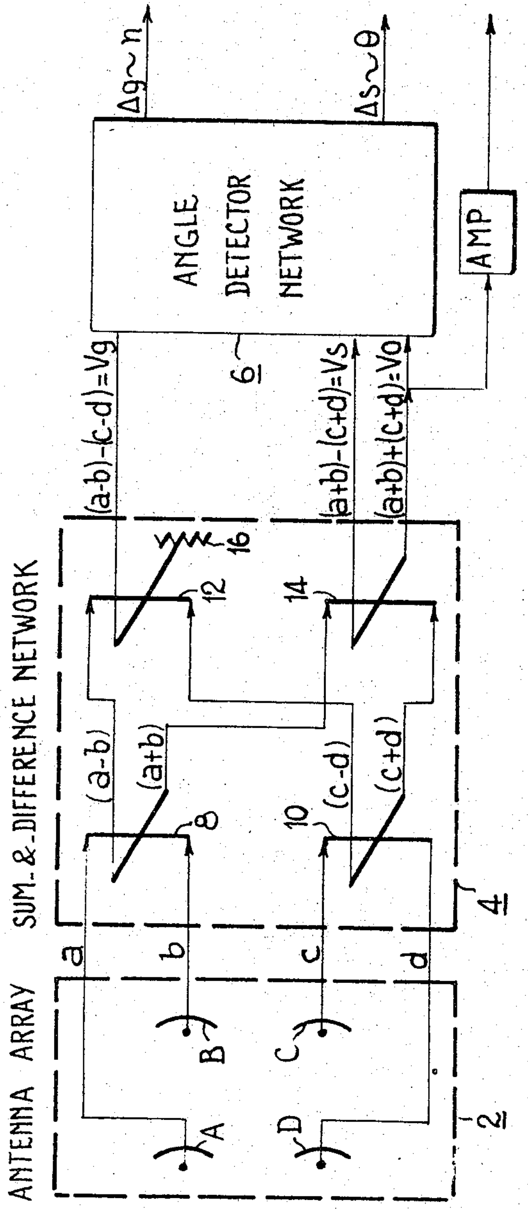
FIG. 1 is a general functional digaram of a monopulse radar receiver system of the sum-and-difference type, which is generally conventional except for the angle-detector network used.
Figure 2:
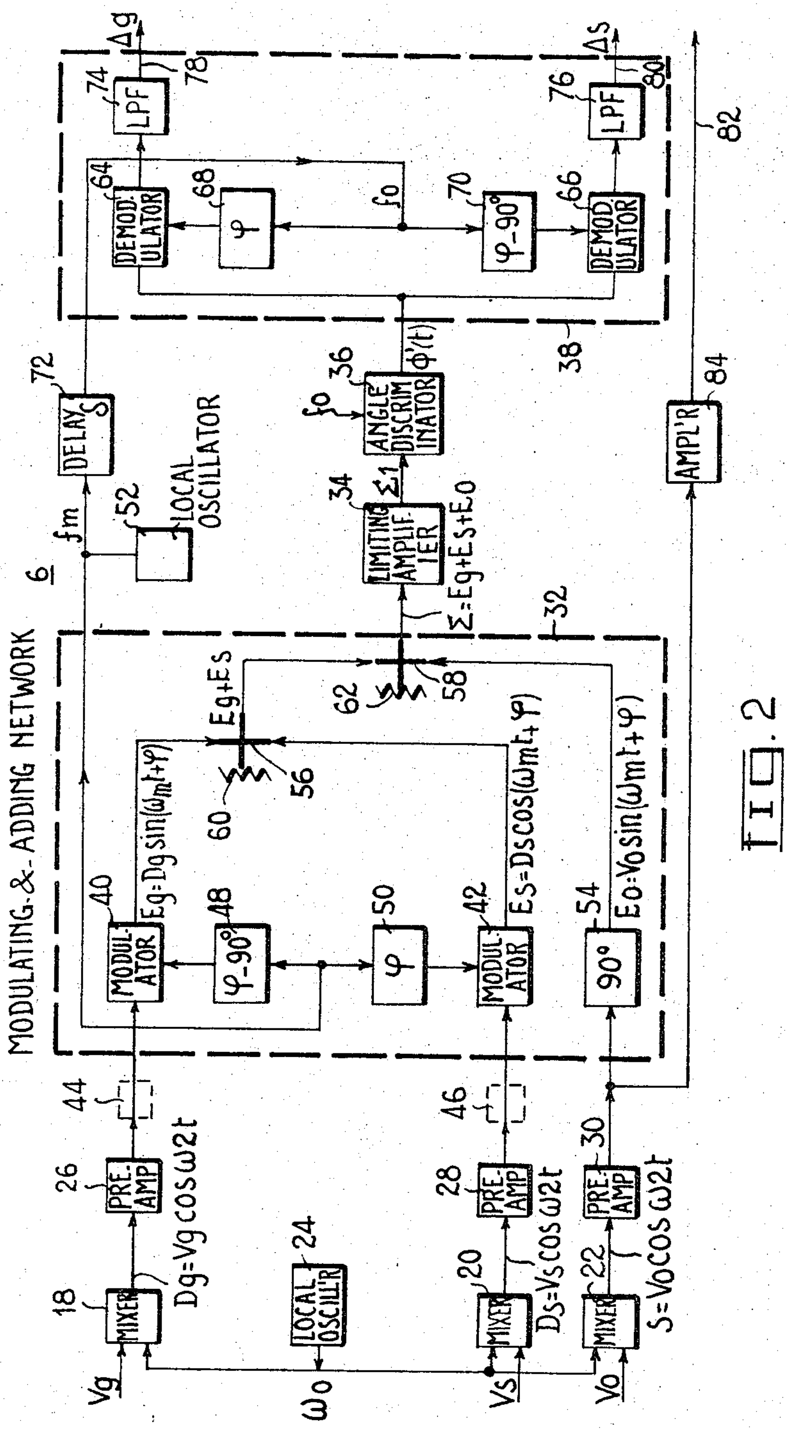
FIG. 2 is a functional digaram of an improved angle-detector network embodying the teachings of the invention.

The monopulse receiver shown in FIG. 1 includes an antenna array 2, a sum-and-difference network 4, both of which may be conventional, and a single-channel detector network according to the invention which is generally designated as the block 6 in FIG. 1 and is shown in detail in FIG. 2.

Antenna array 2 is shown as comprising four antennas A, B, C, D, the antennas in each of the pairs A–B and C–D being spaced horizontally and the two pairs being spaced vertically with respect to each other. It will be understood that this arrangement is merely illustrative, and various other geometrical arrangements, including two-lobe scanning systems using a single pair of "squinted" antennas, may be used.

The video signals *a*, *b*, *c*, *d* sensed by the antennas A, B, C, D of array 2 are applied to the four inputs of the sum-and-difference network 4, which comprises hybrid junctions 8, 10, 12, 14 each having a pair of inputs and a pair of outputs, and each acting to deliver at its outputs the sum and difference, respectively, of the two signals applied to its inputs.

Specifically, the two signals *a* and *b* from a first pair of horizontally spaced antennas A and B of array 2 are applied to the respective inputs of hybrid junction 8, thereby providing the sum signal $(a+b)$ at one output leg of the junction and the difference signal $(a-b)$ at the other output leg. Similarly antenna signals *c* and *d* are applied to the inputs of junction 10, providing the output signals $(c+d)$ and $(c-d)$. The sum and difference signals from the hybrid junctions 8 and 10 are then combined as shown in the further hybrid junctions 12 and 14 to provide four further linear combinations of the four original antenna signals. These combination signals include a sum signal $(a+b)+(c+d)$, designated V*o*, and two difference signals $(a-b)-(c-d)$ designated V*g* and $(a+b)-(c+d)$ designated V*s*. The fourth combination signal, as appearing at one of the output legs of junction 12, is unused and is accordingly dissipated in a matched load impedance 16.

There are thus obtained the three basic signals of any sum-and-difference monopulse receiver, namely the sum signal V*o*, azimuth difference signal V*g* and elevation difference signal V*s*. It is understood that the means for developing these three signals, as typified by the antenna array 2 and the sum-and-difference network 4 shown in FIG. 1, have only briefly been described since they are entirely conventional and may assume forms other than those shown in the figure.

Each of the three signals V*o*, V*g*, V*s* is a simultaneous function of the angular displacement of the target from the boresight (the reference axis of the antenna array 2) in azimuth, this angular displacement being here termed $\eta$, and of the angular target displacement in elevation, termed $\theta$. More precisely, the three signals can be expressed as follows:

$$\begin{aligned} Vo&=A(t)\cos k\eta\cos k\theta \\ Vg&=A(t)\sin k\eta\cos k\theta \\ Vs&=A(t)\sin k\theta\cos k\eta \end{aligned} \qquad (1)$$

In these equations, A(*t*) represents the common amplitude of the received signal as sensed by the antenna array (which signal may be a scattered echo or may convey information from a transponder beacon or the like); *k* is a constant of the antenna array which depends on aperture and lobe characteristics; and the other symbols have the meanings earlier given.

It is apparent from Equations (1) that the ratio $$Vg/Vo=\tan k\eta$$

of azimuth difference signal to sum signal depends only on the azimuth angle $\eta$, and the ratio $$Vs/Vo=\tan k\theta$$

of elevation difference signal to sum signal depends only on elevation angle $\theta$. It is the function of the angle detector network, generally designated 6 in FIG. 1, to combine the three signals so as to derive said ratios in a form usable for the indication of target displacement angles in azimuth and elevation, and for tracking purposes. Simultaneously the sum signal serves to derive a range indication.

In a typical angle detector network of the prior art, which is three-channel in character, the three signals delivered by the sum-and-difference network are first heterodyned with a local frequency from a local oscillator. The three I-F signals are then passed through respective variable amplifiers in the three channels of the network. The three amplifiers have their gain controlled through a common AGC circuit from the output of the sum-signal channel amplifier. The outputs from the respective difference signal channel amplifiers are applied to first inputs of respective phase comparators, whose other inputs are fed with the output from the sum-signal channel amplifier. Thus the outputs of the respective comparators deliver the desired ratio signals respectively proportional to azimuth displacement and elevation displacement.

In another known type of angle detector, the number of channels in the network has been reduced from three to two. For this purpose the difference signals are first combined in phase quadrature to provide a complex difference signal. This complex signal and the sum signal are heterodyned with a local frequency from a local oscillator in the two channels of the network, and are passed through respective variable amplifiers having their gain controlled through a common AGC circuit from the output of the sum-signal amplifier. The output from the complex difference signal channel amplifier and the output from the sum signal channel amplifier are applied to the inputs of a first phase comparator to deliver the azimuth output signal; and the output from the difference channel amplifier is further applied, together with the 90° phase-shifted output of the sum channel amplifier to the inputs of a second comparator, which delivers the elevation output signal.

Prior angle detector networks of the multi-channel types outlined above have several inherent deficiencies which detract from the high performance required of present-day radar systems in view of the enormously increased ranges of the targets that have to be accounted for. The automatic gain control loops make for sluggish response. Furthermore, because the azimuth and elevation difference signal functions have odd symmetry about the origin, accuracy and sensitivity depend on the maintenance of accurately balanced gain and phase characteristics in the respective channel amplifiers, a condition difficult or impossible to maintain in practice over appreciable lengths of time. Single-channel networks have been proposed, but these have depended either on a selective-delay (time-sharing) or a selective-frequency principle, both of which have grave limitations earlier noted herein.

The improved angle-detector network 6 of the invention is free from the above defects. As shown in FIG. 2, the azimuth-difference, elevation-difference and sum signals V*g*, V*s*, V*o* delivered by the sum-and-difference network 4 are first subjected to a generally conventional heterodyning step in the respective mixers 18, 20 and 22, in which they are mixed with the output frequency $(f_0)$ of a local oscillator 24. The resulting intermediate-frequency signals, designated D*g*, D*s* and S, are then separately preamplified in respective narrow-band amplifiers 26, 28, 30. The preamplified signals are then applied to the inputs of a modulating-and-summing network generally designated 32, in which the three input signals are combined in a manner to be presently disclosed in detail to provide a composite signal $\Sigma$. As will be made clear further on, this composite signal is modulated both in amplitude and phase. The composite signal is passed through an amplifier 34 which has an amplitude-limiting characteristic so as to suppress the amplitude-modulation component in the composite signal. The constant-amplitude composite signal (designated $\Sigma 1$) is applied to a frequency discriminator 36 which senses the phase modulation component in the composite signal with respect to the intermediate frequency $f_2$ as a reference. The frequency-discriminated output is applied to a demodulating resolver network generally designated 38 which delivers at its two outputs an azimuth output signal $\Delta g$ proportional to the azimuth angle $\eta$ and an elevation output signal $\Delta s$ proportional to the elevation angle $\theta$.

Returning to the modulating-and-summing network 32, it is seen that the I-F azimuth-difference signal D*g* from the output of preamplifier 26 is applied to a modulating input of a modulator 40, and similarly the I-F elevation-difference signal D*s* from preamplifier 28 is applied to a modulating input of a modulator 42. Adjustable phase shifters 44 and 46, shown in phantom, may if desired be provided in the paths of the preamplifier difference signals to align the phases of the I-F difference signals with the phase of the I-F sum signal should this be found desirable.

The modulators 40 and 42 have their "moduland" inputs fed through respective phase shifters 48 and 50 from a common local oscillator 52 delivering a frequency $f_m$. The frequency $f_m$ is several times lower, e.g. ten times lower, than the intermediate frequency $f_2$. The phase shifters 48 and 50 introduce respective phase displacements differing by 90° between each other, so that the moduland inputs of modulators 40 and 42 receive waves that are in phase quadrature. As here shown, phase shifter 50 associated with the elevation difference signal modulator 42 applies a phase shift angle indicated as $\varphi$ (which may conveniently be +45°), and phase shifter 48 associated with azimuth difference signal modulator 40 applies the phase shift angle $$\left(\varphi-\frac{\pi}{2}\right)$$

i.e. −45° in the case $\varphi=45°$. The modulators 40 and 42 are each of a symmetrical, carrier-suppressing type, and produce respective output signals designated E*g* and E*s* which can be represented by the product of the sinusoidal waves applied to the respective inputs. The sun signals S from the output of preamplifier 30 is applied to a 90° phase shifter 54 shown as forming part of network 32, to provide a signal designated E*o* in quadrature with the sum signal S.

Each of the modulators 40, 42 may be any suitable carrier-suppressing product modulator circuit, various types of which are known. One such circuit suitable for use herein is shown in FIG. 22, page 551 of Terman's Radio Engineer's Handbook (1st edition, 2nd reprint 1950).

The three signals E*g*, E*s*, E*o*, are now added together to provide the resultant composite signal Σ mentioned above. The summing network, in the preferred embodiment shown, comprises a pair of hybrid junctions 56 and 58. The modulated difference signals E*g* and E*s* are applied to the input legs of hybrid junction 56 to provide a sum signal $(Eg+Es)$ at the appropriate output leg of the junction. This sum signal together with the phase-shifted sum signal E*o* are applied to the input legs of hybrid junction 58. The output of junction 58 therefore provides the composite signal Σ. The unused output legs of the hybrid junctions 56 and 58 which would deliver difference signals, are shown provided with matched resistance loads 60, 62 for dissipating these difference signals.

The nature of the composite signal Σ will now be disclosed in detail. The expressions for E*g*, E*s* and E*o* will first be written:

$$Eg=Vg\cos w_2t\cos\left(w_mt+\varphi-\frac{\pi}{2}\right)=Vg\cos w_2t\sin(w_mt+\varphi) \qquad (2)$$

$$Es=Vs\cos w_2t\cos(w_mt+\varphi) \qquad (3)$$

$$Eo=Vo\cos\left(w_2t+\frac{\pi}{2}\right)=Vo\sin w_2t$$

In these equations, $w_2$ represents the pulsation (2π times the frequency $f_2$) of the signal delivered by the mixer (18–20), and $w_m$ represents the pulsation (2π times the frequency $f_m$) of the signal delivered by local oscillator 52.

The expression for the composite signal Σ is obtained by adding the three Equations 4, 2 and 3.

$$\Sigma=Vo\sin w_2t+[Vg\sin(w_mt+\varphi)+Vs\cos(w_mt+\varphi)]\cos w_2t$$

Appliction of an elementary trigonometric relation immediately shows that the above expression can be rewritten:

$$\Sigma=V\sin[w_2t+\Phi(t)] \qquad (5)$$

if one puts $$V^2=Vo^2+[Vg\sin(w_mt+\varphi)+Vs\cos(w_m+\varphi)]^2 \qquad (6)$$

and $$\Phi(t)=\text{Arctan}\frac{1}{Vo}Vg\sin(w_mt+\varphi)+Vs\cos(w_mt+\varphi) \qquad (7)$$

Equation 5 makes it apparent that the composite signal Σ of the invention is modulated both in amplitude and phase. When this signal is passed through the limiting amplifier 34, the amplitude modulation component (V) is suppressed. The limiter may be of a generally conventional type as used in frequency-modulating receivers for removing any amplitude modulation present in the frequency-modulated wave, so that the signal delivered by circuit 34 is of uniform crestamplitude, but is still, of course, modulated in phase in accordance with the phase-modulation component $\Phi(t)$ as given by Equation 7. The circuit 34, at the same time as it performs its limiting function, serves as a broadband I–F amplifier with a pass-band having the center frequency $f_2$ and sufficient spread to pass the modulation frequency $f_m$ as well as the highest frequencies contained in the information part $A(t)$, if any, of the received signal.

The constant-amplitude, angle-modulated wave from the limiting amplifier 34 is applied to the conventional frequency discriminator 36, which in the usual manner delivers an output voltage that is at all times substantially proportional to the departure of the instantaneous frequency of the signal applied to the discriminator, from the reference frequency of the discriminator, selected equal to the intermediate frequency $f_2$. Since the instantaneous frequency of the signal from amplifier 34 is the time rate of change, or time derivative, of the angle of said signal, it is clear that the output from discriminator 36 is proportional to the time derivative of the variable phase angle $\Phi(t)$ of the signal as given by Equation 7. This output therefore is obtained by differentation of Equation 7 with respect to time. Putting for convenience in writing $$\frac{Vg}{Vo}=g,\ \frac{Vs}{Vo}=s,\text{ and }(w_mt+\varphi)=\tau \qquad (8)$$

we get $$\Phi'(t)=w_m\frac{g\cos\tau+s\sin\tau}{1+(g\sin\tau+s\cos\tau)^2} \qquad (9)$$

Such is the form of the signal applied to the demodulating resolver network 38. In this network the single signal channel is split into two signal paths, and the angle-discriminated signal $\Phi'(t)$ is applied in parallel to the "demoduland" inputs of the two demodulators 64 and 66. These may be constructed to operate in a manner similar to the modulators 40 and 42, and are fed at their demodulating inputs, by way of the phase shifters 68 and 70, with the $f_m$ frequency signal from local oscillator 52. It will be noted that a delay circuit 72 is preferable interposed ahead of the input junction of phase shifters 68 and 70 for reasons later explained. Phase shifter 68 introduces a phase displacement angle $\varphi$ (the same as the phase displacement previously referred to by this letter in the modulating network), while phase shifter 70 introduces the complementary phase angle $$\left(\varphi-\frac{\pi}{2}\right)$$

As indicated earlier, phase angle $\varphi$ is conveniently 45° though other angles may be used.

The demodulators 64, 66 produce output signals P($g$) and P($s$) respectively, which are the products of the signals applied to the inputs of the demodulators. Disregarding for the moment the action of delay line 72, the demodulators produce the following signals:

$$P(g)=\Phi'(\tau)\cos\tau \qquad (10)$$

and $$P(s)=\Phi'(\tau)\sin\tau$$

The output signals from the demodulators are shown applied to respective low-pass filters 74 and 76 and thence to the network output terminals 78 and 80. While the low pass filters 74 and 76 have been shown as separate entities for convenience, the filtering function may, in practice, conveniently be performed by the R-C networks of the demodulators 64 and 66 and separate filters may be omitted.

Substituting Equation 9 into Equation 10 and expressing the sinusoidal functions of $\tau$ in terms of cos $2\tau$ and sin $2\tau$, the equation for P($g$) becomes:

$$P(g)=\frac{w_m}{2}\frac{g(1+\cos 2\tau)-s\sin 2\tau}{1+\frac{g^2}{2}(1-\cos 2\tau)+gs\sin 2\tau+\frac{s^2}{2}(1+\cos 2\tau)}$$

Expanding this expression into an integral polynomial series and disregarding terms of fourth and higher order, we get:

$$P(g)=\frac{w_m}{2}[g(1+\cos 2\tau)-s\sin 2\tau]\left[1-\frac{g^2}{2}(1-\cos 2\tau)-gs\sin 2\tau-\frac{s^2}{2}(1+\cos 2\tau)\right] \qquad (11)$$

The low-pass filters 74 and 76, or their equivalents within the demodulators 64, 66 have a cutoff frequency lower than $2f_m$. Hence the expression for the signal $\Delta g$ appearing at the output line 78 is obtained by cancelling the pure oscillatory terms in expression 11. This is done by expanding the product in Equation 11 and equating all sine and cosine terms with zero and equating all squared sine and cosine terms with ½ in the expanded product. The above calculation holds, mutatis mutandis, for the elevation output signal as well as the azimuth output signal. After reduction we arrive at the following expressions for the output signals:

$$\begin{cases}\Delta g=\frac{w_m}{2}g\left(1-\frac{g^2}{4}-\frac{s^2}{4}\right)\\ \Delta s=\frac{w_m}{2}s\left(1-\frac{g^2}{4}-\frac{s^2}{4}\right)\end{cases} \qquad (12)$$

Assuming the azimuth and elevation angles are small, meaning that the target is rather close to the boresight axis, a condition always met in a tracking radar, Equations 12 reduce to:

$$\begin{cases}\Delta g=\frac{w_m}{2}g\\ \Delta g=\frac{w_m}{2}s\end{cases} \qquad (13)$$

Substitution of the values of $g$ and $s$ derived from Equations 8 and 1, and assimilation of the small angles with their tangents, yields the following final values for the output signals:

$$\begin{cases}\Delta g=\frac{w_m}{2}k\eta\\ \Delta s=\frac{w_m}{2}k\theta\end{cases} \qquad (14)$$

It is seen that the desired separation of the azimuth and elevation information at the output of the system has been achieved.

It will be noted that the approximation involved in cancelling the second-order terms in Equations 12, in practice means that so long as the ratios ($Vg/Vo$) and ($Vs/Vo$) are each smaller than 1/10, the error in the azimuth and elevation indications is less than 1/200 or ½%.

It was implicitly assumed in the above discussion that the limiting amplifier 34 possesses a constant phase/frequency response. This is not strictly true in practice, and the amplifier 34 will generally deliver a signal wherein the phase $\Phi(t)$ varies approximately linearly with frequency about the center frequency value $f_2$. The slope of the linear phase/frequency response curve is sometimes called the group transmission time of the amplifier and is here designated $\delta$. Appreciable phase distortion may thus be introduced into the signal passed by amplifier 34 over the broad frequency band encompassed by the signal. Such phase distortion in the signal applied to discriminator 36 may, in turn, make it impossible for the demodulating resolver network 38 to accomplish a full resolution of the signal into separate azimuth and elevation components as is desired according to the invention.

To avoid such spurious cross-coupling between the outputs due to variable phase response of the amplifier 34, according to a feature of this invention the delay line 72 is provided. This delay line or phase shifter is constructed and/or adjusted to introduce a delay corresponding to the group transfer time $\delta$ of the amplifier 34 into the signal applied from oscillator 52 to the demodulating resolver network 38. The proper delay value can easily be predetermined from a knowledge of the characteristics of amplifier 34, or can be determined by test as will be well understood by those familiar with the art. Provision of the delay line 72 thus adjusted will restore the desired separation between the azimuth and elevation output information of the system.

This aspect of the invention can be demonstrated by the following summary mathematical analysis.

Returning first to the ideal case earlier assumed where amplifier 34 has a constant phase response at all frequencies, it is clear from Equation 5 that the amplitude-limited signal, designated $\Sigma 1$, delivered by the amplifier to discriminator 36 is of the form:

$$\Sigma 1=A\sin[w_2t+\Phi(t)] \qquad (15)$$

where A is the constant crest amplitude imposed by the limiting amplifier 34. Assuming now that this amplifier does not have such ideal phase response but instead delivers a signal wherein the phase $\Phi(t)$ varies approximately linearly with frequency about the center frequency value $f_2$, the slope of the response curve will be the group transmission time of the amplifier, identified above as $\delta$. The expression for the true amplifier output signal, designated $\Sigma 2$, is obtained by substituting $(t-\delta)$ for $t$ in Equation 15. Thus $$\Sigma 2=A\sin[w_2(t-\delta)+\Phi(t-\delta)] \qquad (16)$$

The output signal from discriminator 36 will now be $\Phi'(t-\delta)$ or $\Phi'(\tau-w_m\delta)$ instead of $\Phi'(\tau)$, and correspondingly the outputs from demodulators 64 and 66, instead of the form indicated by Equations 10, will take the form:

$$P_1(g)=\Phi'(\tau-w_m\delta)\cos\tau \quad (17)$$
$$P_2(s)=\Phi'(\tau-w_m\delta)\sin\tau$$

A calculation similar to the one outlined above (see Equations 11 through 13) shows that the output signals will now be of the form $$\Delta g^2=w_m(g\cos w_m\delta+s\sin w_m\delta)$$
$$\Delta s^2=w_m(s\cos w_m\delta-g\sin w_m\delta)$$

or, if $w_m\delta$ is recognized as being small $$\Delta g^2=w_m(g+sw_m\delta) \quad (18)$$
$$\Delta s^2=w_m(s-gw_m\delta)$$

These equations demonstrate imperfect resolution of the azimuth and elevation angle information, i.e. cross coupling between the outputs of the network, as noted above.

Next introducing the delay line 72 of the invention, the waves applied to the domodulting inputs of the demodulators 64 and 66 will be delayed by the common delay $\delta$. The demodulator outputs, instead of taking the form indicated above by Equations 17, will now be of the form:

$$P_3(g)=\Phi'(\tau-w_m\delta)\cos(\tau-w_m\delta) \quad (19)$$
$$P_3(s)=\Phi'(\tau-w_m\delta)\sin(\tau-w_m\delta)$$

When these equations are expanded and the pure oscillatory terms suppressed to allow for the action of the low-pass filters 74 and 76, the output signals from the system will be found to take the form:

$$\begin{cases}\Delta g3=\dfrac{w_m}{2}g\\ \Delta s3=\dfrac{w_m}{2}s\end{cases} \quad (20)$$

which is identical with that of Equation 13. The spurious cross coupling between the output signals is thus shown to be eliminated.

It will be noted from FIG. 2 that the sum signal (S) is tapped from the output of preamplifier 30 and applied to a third output 82 of the system by way of an amplifier 84, for conventional purposes, chiefly determination of target range.

It is important to note in this respect that the provision of the sum signal amplifier 84 separate from the amplifier 34 present in the single channel of the network of the invention is unobjectionable since there is no necessity of maintaining balanced gain and phase characteristics between the two amplifiers. This is because the amplified sum signal beyond amplifier 84 no longer plays any part in the demodulating or resolving step involved in the derivation of the azimuth and elevation output signals. For the purposes of this resolving step, the sum signal has, in effect, been amplified along with the difference signals in the common amplifier 34 of the single-channel network of the invention. This contrasts with conventional angle-detector networks both of the two-channel and, with greater reason, of the three-channel type, where the resolution of the angle signals involved comparison of the amplified difference signal (or signals) with the amplified sum signal, and hence required the maintenance of stricly balanced characteristics between two, or three, amplifiers.

It will also be appreciated that the provision of the common limiting amplifier 34 in the single network channel of the invention eliminates the need of any automatic gain control circuitry for normalizing the respective signals, as has generally been required heretofore. This improves the response rate of the system. The use of a simple amplitude limiter to replace a plurality of AGC loops, as permitted by the invention, is a direct consequence of the unique nature of the angle-modulated composite signal used herein.

The modulating frequency $f_m$ used according to the invention should be selected several times higher than the reciprocal of the pulsewidth in the received radar pulses, to ensure that no information is lost during demodulation. On the other hand, the modulating frequency may be but slightly above the passband of the narrow band I-F preamplifiers. It is found that in these conditions the signal-to-noise ratio and hence the sensitivity of a system according to the invention is substantially the same as that of a high-performance conventional system using a three-channel angle detector network. The advantage, in this respect, is that the improved system attains such high sensitivity value with greater simplicity in design and adjustment and maintains it stably and reliably over longer periods of time.

In an illustrative application of the disclosed system, the radar system used a carrier frequency of about 5000 megacycles and a pulse amplitude modulation with a repetition rate of 100 c.p.s. and a pulse width of 1 microsecond. The heterodyning frequency $f_0$ was 5030 megacycles, the local frequency $f_m$ 3 megacycles and the intermediate frequency 30 megacycles.

Figure 3:
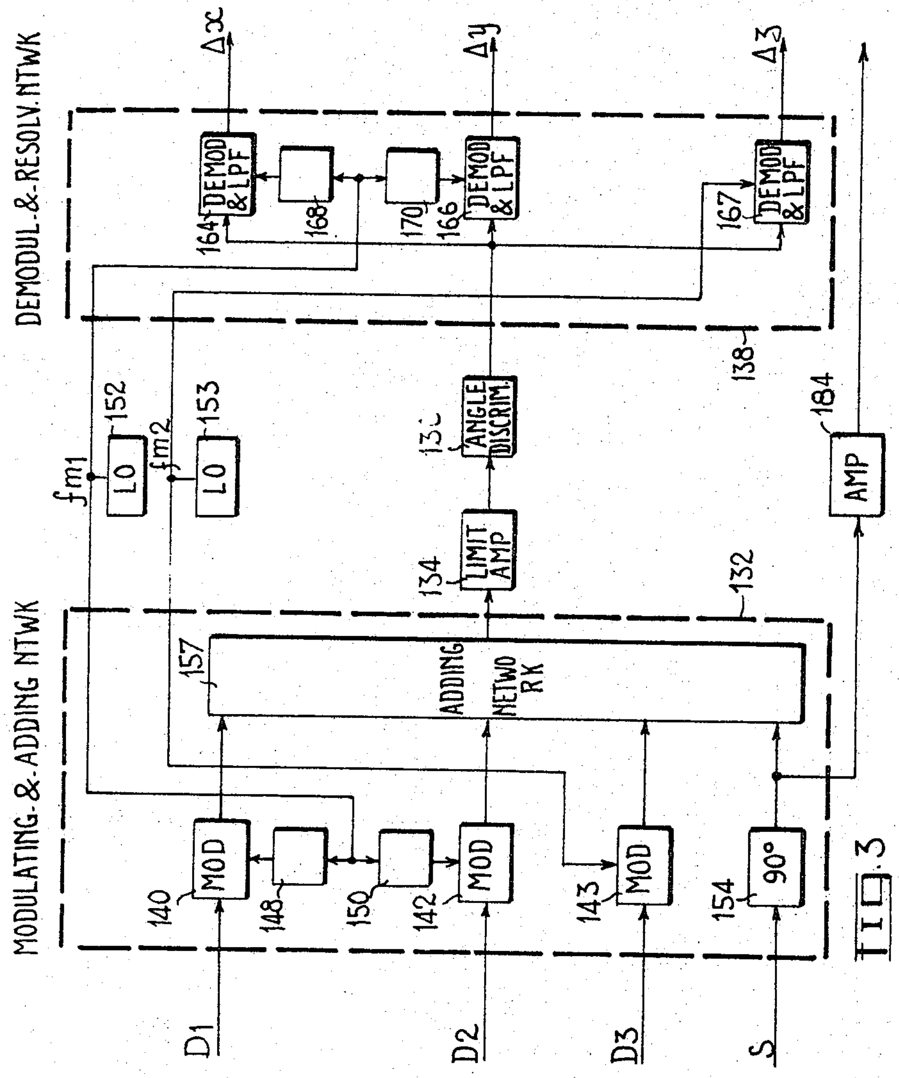
FIG. 3 is a simplified diagram of another embodiment of the invention in the case of four input signals.

The chief utility of the invention at the present time lies with sum-and-difference monopulse systems as here disclosed, and in the particular application the number of signals applied to the input of the system is three, with each input signal being a function of two independent variables. It is demonstrable, however, that the teachings of the invention can be extended to cases where there are more than three input signals. FIG. 3 illustrates by way of example an embodiment of the invention involving four input signals, such that the ratio of each of three of them to the fourth, is a simultaneous function of three independent variables $x$, $y$ and $z$. Such a situation is quite frequently encountered in telemetering systems.

Referring to FIG. 3, the four input signals (at the intermediate carrier fraquency $f_2$) are designated $D_1$, $D_2$ $D_3$ and S, and it is assumed that the following relations hold:

$$D_1/S=f(x,y,z) \qquad D_2/S=g(x,y,z) \qquad D_3/S=h(x,y,z)$$

The system of the invention here serves to deliver the output signals $\Delta x$, $\Delta y$, $\Delta z$, which are separate functions of the respective independent variables $x$, $y$ and $z$.

As shown, each of the three input signals $D_1$, $D_2$, $D_3$ is applied to the modulating input of a respective product modulator respectively designated 140, 142, 143, which form part of a modulating-and-adding network generally designated 132. Two local oscillators 152 and 153 are provided, which deliver the frequencies $fm_1$ and $fm_2$, respectively. The output of oscillator 152 is applied to the moduland inputs of both modulators 140 and 142 by way of respective phase shifters 148 and 150 which impart respective phase shifts differing by 90° to the moduland frequency $fm_1$. The $fm_2$ output of oscillator 153 is applied to the moduland input of modulator 143.

The fourth input signal S is shifted 90° in phase in a phase shifter 154. The outputs of all three modulators and the phase shifted S signal from phase shifter 154 are applied to an adding network 157 (forming part of network 132), which adding network may be of any suitable character, e.g. one using hybrid junction adders or any other suitable circuit capable of providing an output signal that is the vector sum of the signals applied to its inputs.

The sum signal from adder network 157 is a composite signal which is modulated both in amplitude and phase. This composite signal is passed through a common limiting amplifier 134 of conventional type which imposes a constant value to its amplitude thereby suppressing the amplitude modulation component in the composite signal.

The amplitude-limited composite signal from amplifier 134 is applied to a frequency discriminator 136 which senses the phase modulation component in the composite signal with reference to the intermediate frequency $f_2$. It can be shown by a mathematical analysis generally similar to the one given in regard to the first embodiment, that the phase modulation component in the composite signal is a sum of three time function terms having amplitudes respectively proportional to the variables *x*, *y* and *z*. Accordingly, the output of discriminator 136 is applied to a demodulating network generally designated 138 which is here shown as including three product demodulator cum lowpass filter circuits 164, 166 and 167. The demodulators may be of the type earlier indicated herein. Demodulators 164 and 166 have their demodulating inputs supplied with the output from local oscillator 152 by way of the phase shifters 168 and 170 which impart phase shifts differing by 90°. Demodulator 167 has its demodulating input supplied with the $fm_2$ frequency from oscillator 153. Delay devices (not shown) similar to 72 (FIG. 2) may if desired be provided to compensate for the group transfer time of the single-channel amplifier. The demodulator outputs provide the desired output signals which are separate functions of the three variables *x*, *y* and *z*. The fourth input signal S may if desired and as here shown, be also passed to the output by way of an amplifier 184.

Various other modifications and extensions of the invention will readily be disigned by those familiar with the art after gaining an understanding of the present disclosure, depending on specific requirements. Thus, reverting to the sum-and-difference monopulse system which constitutes the chief embodiment of the invention, it will be apparent to radar engineers that while the disclosure given with reference to FIGS. 1 and 2 more particularly described amplitude sensing of the input signals, that in view of the well-known fundamental equivalence between amplitude and phase sensing, the invention would equally be applicable to the detection of phase-modulated input signals.

It will be noted that in the first of the disclosed embodiments (FIG. 2) the input signals D*g* and D*s* are modulated, in the modulating-and-adding network 32, by means of phase-diversified outputs from a common local oscillator at frequency $f_m$. In the embodiment of FIG. 3, the input signals $D_1$, $D_2$, $D_3$ are modulated, in the modulating-and-adding network 132, by means of frequency and phase diversified outputs from two local oscillators at frequencies $fm_1$ and $fm_2$. Hence, recalling that instantaneous frequency represents the time derivative of phase (as earlier noted herein), the terms "phase" and "frequency" should not be interpreted in the ensuing claims as mutually excluding one another, unless the ensuing claims specifically refer to such exclusion. In either case, a composite signal is derived which is modulated both in amplitude and phase, the phase modulation component comprising a sum of time function terms whose amplitudes are measures of the respective variables. Since these time function terms are diversified in phase (and/or frequency), they can be separated by passing the composite signal through a single-channel limiting amplifier and frequency discriminator and then through a suitable demodulating and resolving network, thereby obtaining the desired outputs which are functions of the separated variables.

What I claim is:

1. A system for deriving from a plurality of input signals each of which is a simultaneous function of a set of independent variables a set of output signals that are substantially separate functions of the respective variables, comprising:

a local oscillator means;

a combining network including:

modulator means connected in phase-diversified relation with said oscillator means, and summing means;

said modulator means and summing means being connected with said input signals so as to combine them into a composite signal modulated both in amplitude and phase whereby the angle modulation component in said composite signal will comprise a sum of periodical time function terms having magnitudes respectively proportionate to the separate variables;

means including a frequency discriminator connected for deriving from said composite signal a signal corresponding to the phase modulation component therein and demodulator means connected to receive said phase modulation component and connected in angle-diversified relation with said local oscillator means to derive the respective magnitudes of said time function terms therein as separate measures of said variables.

2. A system according to claim 1, which forms part of a monopulse radar receiver, and wherein said input signals comprise an azimuth difference, an elevation difference and a sum signal, and said output signals are separate functions of azimuth and elevation.

3. A system according to claim 1, including limiting amplifier means connected in the path of said composite signal ahead of said frequency discriminator for amplifying the composite signal while limiting the crest amplitude thereof so as to suppress the amplitude modulation component of said composite signal.

4. A system according to claim 3, including delay means connected between said oscillator means and said demodulator means and introducing a delay corresponding to the group transmission time of said amplifier means.

5. A system according to claim 1, including phase shifting means connected for adjusting, the phases of said input signals prior to application thereof to the modulator means.

6. A system according to claim 1, wherein said summing means comprise hybrid junctions.

7. A system according to claim 1, wherein said input signals are intermediate-frequency signals derived from output of a heterodyning stage.

8. A system according to claim 1, wherein said modulator means comprise carrier suppression modulators.

9. A system for deriving from a plurality of input signals such that the ratio of each of all but one thereof to said one input signal is a simultaneous function of a set of independent variables, a set of output signals that are substantially separate functions of the respective variables, comprising:

local oscillator means;

a combining network including:

modulator means corresponding in number to that of said variables and having first inputs connected to receive said all-but-one signals and second inputs connected in phase-diversified relation with said local oscillator means; and summing means connected to receive modulated signals from said modulator means and said one input signal and combining said signals into a composite signal modulated both in amplitude and phase, whereby the phase modulation component in said composite signal will comprise a sum of periodical time function terms equal in number to that of said variables, having magnitudes respectively proportional to the separate variables;

means including a frequency discriminator connected for deriving from said composite signal a signal corresponding to the phase modulation component therein; and demodulator means corresponding in number to that of said variables and having their one inputs all connected to receive the phase modulation component signal from said discriminator means and other inputs connected in phase-diversified relation to said local oscillator means so as to derive the respective magnitudes of said time function terms as separate measures of said variables.

10. In a monopulse radar receiver system, the combination comprising means developing an azimuth difference signal, an elevation difference signal and a sum signal;

local oscillator means;

a combining network including two modulators having first inputs connected in phase quadrature with said local oscillator means and having second inputs connected to receive said azimuth difference signal and said elevation difference signal respectively; and summing means connected for additively combining the modulated outputs of said modulators with each other and with said sum signal; whereby to produce a composite signal modulated both in amplitude and phase wherein the phase modulation component comprises a sum of periodical time function terms having magnitudes respectively proportional to the azimuth and elevation angles;

means including a frequency discriminator connected for deriving from said composite signal a signal corresponding to the phase modulation component therein; and demodulator means connected to receive said phase modulation component and connected in phase-diversified relation with said oscillator means to derive the respective magnitudes of said time function terms as separate measures of azimuth and elevation.

11. A system according to claim 10, including means for phase-displacing said sum signal 90° prior to combining it with said modulated outputs.

12. A system according to claim 10, wherein said summing means comprise a first hybrid junction connected to receive said modulated signals at respective inputs thereof and to deliver a summation signal at one output thereof, and a second hybrid junction connected to receive said summation signal and said input sum signal at respective inputs thereof and to deliver said composite signal at one output thereof, and matched resistive loads terminating the second outputs of the respective hybrid junctions for absorbing the difference signals produced at said second outputs.

References Cited

UNITED STATES PATENTS

| | | | |
|---|---|---|---|
| 3,044,062 | 7/1962 | Katzin | 325—305 |
| 3,162,851 | 12/1964 | Kamen et al. | 343—16 |
| 3,176,295 | 3/1965 | Kirkpatrick et al. | 343—16 |

RODNEY D. BENNETT, *Primary Examiner.*

CHESTER L. JUSTUS, *Examiner.*

J. P. MORRIS, *Assistant Examiner.*